United States Patent [19]

Zucchetti

[11] Patent Number: 4,941,399
[45] Date of Patent: Jul. 17, 1990

[54] AUTOMATIC APPARATUS FOR THE PREPARATION OF EXPRESSO COFFEE

[75] Inventor: Elia Zucchetti, Borgarello, Italy
[73] Assignee: Brasilia Srl, Italy
[21] Appl. No.: 301,922
[22] Filed: Jan. 26, 1989

[30] Foreign Application Priority Data

Jan. 26, 1988 [IT] Italy ............................. 19204 A/88

[51] Int. Cl.$^5$ ............................................. A47J 31/34
[52] U.S. Cl. ................................. 99/289 P; 99/302 P
[58] Field of Search .............. 99/189 P, 289 R, 289 P,
99/279, 287, 286, 297, 298, 300, 302 R, 302 P;
426/433

[56] References Cited

U.S. PATENT DOCUMENTS

| | | | |
|---|---|---|---|
| 3,055,286 | 9/1962 | Valente | 99/289 R |
| 3,791,284 | 2/1974 | Donot | 99/302 R |
| 4,421,014 | 12/1983 | Vicker | 99/289 P |
| 4,829,889 | 5/1989 | Takeuchi | 99/289 P |

FOREIGN PATENT DOCUMENTS 2544184 10/1984 France .

Primary Examiner—Robert W. Jenkins
Attorney, Agent, or Firm—Griffin, Branigan & Butler

[57] ABSTRACT

An automatic apparatus for the preparation of one or more servings of expresso coffee comprises a rotating board provided with through cylindrical holes which in a first position of rotation of the board are fed with a predetermined amount of fresh coffee grounds, which is also pressed, and by the rotation of the board are brought to an infusion position and lastly to a position of discharge of the coffee grounds.

In the infusion position, the pressed coffee grounds, contained in the through hole of the rotating board, are vertically aligned in a tight manner with an above positioned shower for distribution of a feed of hot water under pressure and with an under positioned filter for the collection of the prepared expresso coffee; the space above and under said shower is in communication with said feed of hot water under pressure through a non return valve having a calibrated opening pressure, which opens upon a tight seal between said board and said filter as well as with said collecting filter which has been established under the action of the pressure of said feed of hot water, and through a relief valve which opens in the absence of said pressure of the hot feed of water and under the action of the residual pressure under said filter.

12 Claims, 5 Drawing Sheets

AUTOMATIC APPARATUS FOR THE PREPARATION OF EXPRESSO COFFEE

SPECIFICATION

The present invention relates to the preparation of expresso coffee and more specifically to an automatic group for carrying out such a preparation.

Briefly stated, the stardard operations in the preparation of expresso coffee comprise:

(a) the charging in a suitable filter-carrier of a proper amount of fresh coffee grounds suitably pressed;

(b) the mounting of the filter-carrier at the feeding shower of an infusion apparatus connected to a supply of water having a proper temperature and a sufficient pressure;

(c) the preparation of the desired serving of expresso coffee;

(d) the discharge of the exhausted coffee (coffee used grounds).

These operations, which are characteristic of the hand operated, bar or family machines, must necessarily be repeated also in automatic apparatus, such as for instance those of the automatic distributing machines and this object has been looked for and realized by a great number of technical solutions, taking also into account that the hand operated machine is permanently controlled and assisted by the operator or barman, whereas it is not true for the automatic apparatus whereby for the latter reliability and use resistance are required.

One of the main problems, well known to those skilled in the art, is that of the disposal of the coffee grounds which, especially in the machines with high utilization frequency, retain a significant amount of moisture. Consequently the disposal firstly involves problems of soiling of the adjacent members of the apparatus and secondly involves imperfect cleaning of the filter-carrier, in which residues of coffee grounds remain which within a short time may originate mildew and other degradation problems.

The purpose of the present invention is that of solving the above briefly mentioned problems and drawbacks and thus providing an automatic apparatus for the preparation of expresso coffee in which the reliable preparation of predetermined serving of expresso coffee is alo accompanied by a certain disposal of the coffee grounds in a "not wet" or dry condition thus avoiding both the soiling of the adjacent member and the retention of residues within the filter-carrier.

Such a object is achieved by an automatic apparatus for the preparation of expresso coffee in one or more servings, of the type comprising a rotating board provided with at least one through cylindrical hole of suitable size to contain a predetermined amount of fresh coffee grounds, said board being driven into rotation by motor means so that said at least one cylindrical hole sequentially takes three predetermined positions, respectively, of charging and pressing of the desired amount of fresh coffee grounds, infusing the grounds with hot water under pressure and discharging the used coffee grounds, said board being housed between two fixed plates, the upper or top plate of which supports means for the charging of fresh coffee grounds into said at least one cylindrical hole, pressing means for pressing the coffee grounds when it is charged within said at least one cylindrical hole, and ejecting means for the used coffee grounds, said charging and pressing means and said ejecting means being mounted at diametrically opposed positions with respect to said rotating board, characterized in that at the position of infusion of hot water under pressure said upper plate is provided with a support for the infusion shower having a cylindrical cavity in which a piston is slidably housed, said cavity being into communication, through flow intercepting valve means, with a supply of hot water under pressure, said shower being mounted under said piston and being into communication with said cavity above said piston both through first non return valve means, having a predetermined opening pressure and through second relief means, said lower plate being provided at said infusion position with a filter-carrying cavity, communicating with a delivery spout for expresso coffee, said first non return valve means being set for opening when the hot water feeding pressure is higher than a prefixed value, said second relief valve means being arranged so as to vent the residual pressure under said shower and of the above positioned piston.

The peculiar features and the advantages of the present invention shall appear more clearly from the following description of a preferred embodiment, having exemplifying but non limiting purpose, related to the accompanying drawings in which.

Figure 1:
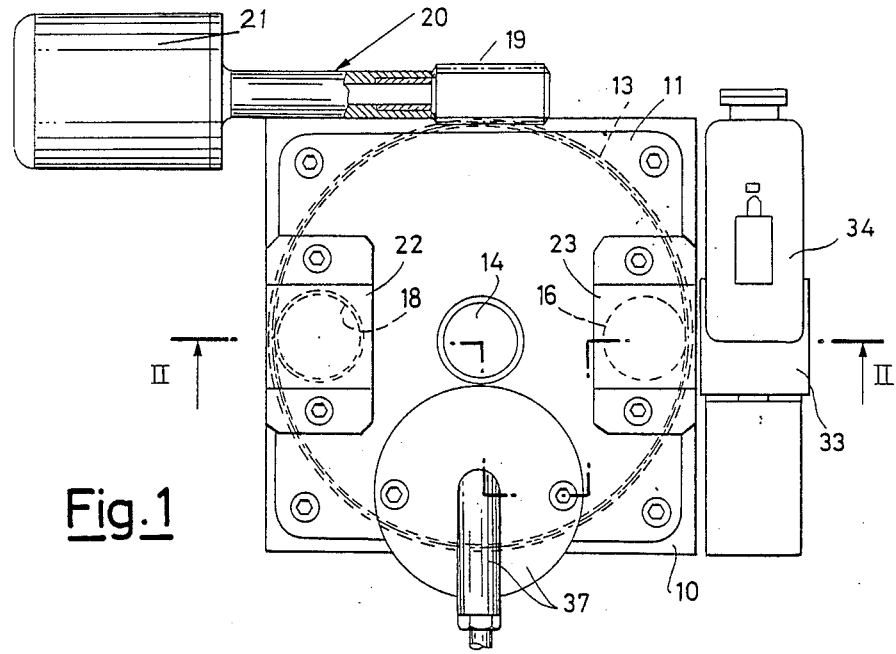
FIG. 1 is a plan view from above of the automatic apparatus according to the invention.
Figure 2:
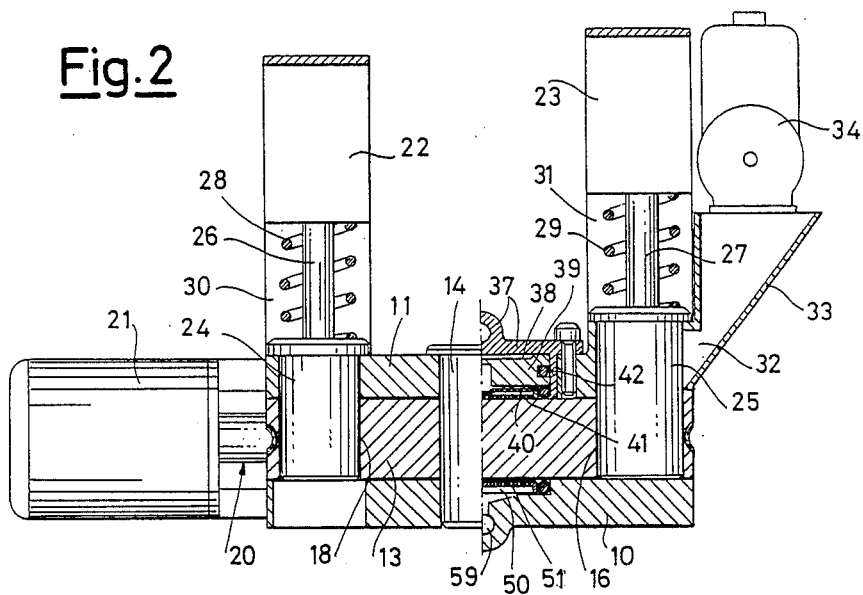
FIG. 2 is cross-section view along the plane II—II of FIG. 1.
Figure 9:
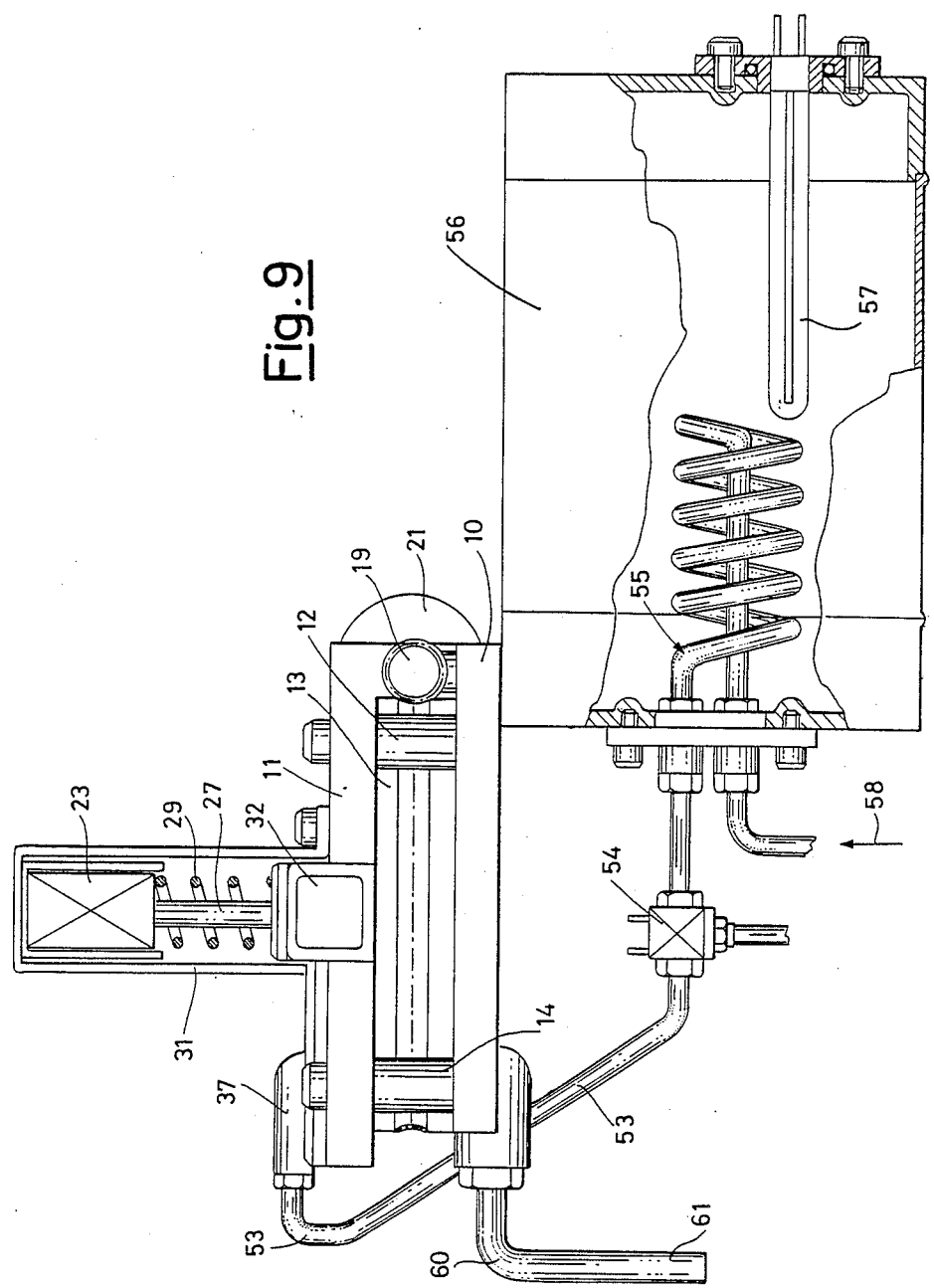
FIG. 9 is a front partial and partially in cross-section view of the automatic apparatus of FIG. 1.

Referring firstly to FIGS. 1, 2 and 9, the automatic apparatus for the preparation of expresso coffee according to the present invention comprises a lower or bed flange 10 and an upper plate or flange 11, fixed to each other by means of spacer bars 12.

Between the flanges 10 and 11 a rotatable circular board 13 is positioned, which is mounted so as to be rotatable around a central pin 14; four through cylindrical holes, respectively indicated by the references 15, 16, 17 and 18 are formed in the board 13, which, in the illustrated embodiment, are equal two by two (namely 15 and 17, 16 and 18) and of a size corresponding to one or two servings of expresso coffee.

The outer edge of the rotatable board 13 is provided with a toothing suitable for the meshing with the threaded part with worm thread 19 of an actuator 20, driven by an electrical motor 21, preferably of the step-by step type.

Above the upper fixed flange 11 there are mounted at diametrically opposed positions with respect to the rotatable board 13, two electromagnets, respectively 22 and 23, suitable to control the operating displacements of two corresponding pistons 24 and 25, having respectively the functions of ejector of the coffee grounds (piston 24) and of presser (piston 25), the pistons being actuated through the related stems 26 and 27, against the action of opposing springs 28 and 29.

The two electromagnets are mounted to respective supports 30 and 31 fastened to the upper flange 11. A side opening 32 is formed in the support 31 for the introduction of fresh coffee grounds in a preselected amount. It can take place by means of a hopper 33 in turn fed by a dosing mechanism 34 or by means of a dosing cylinder-and-piston assembly (partially shown in FIG. 5 and generically indicated by reference 35).

Figure 3:
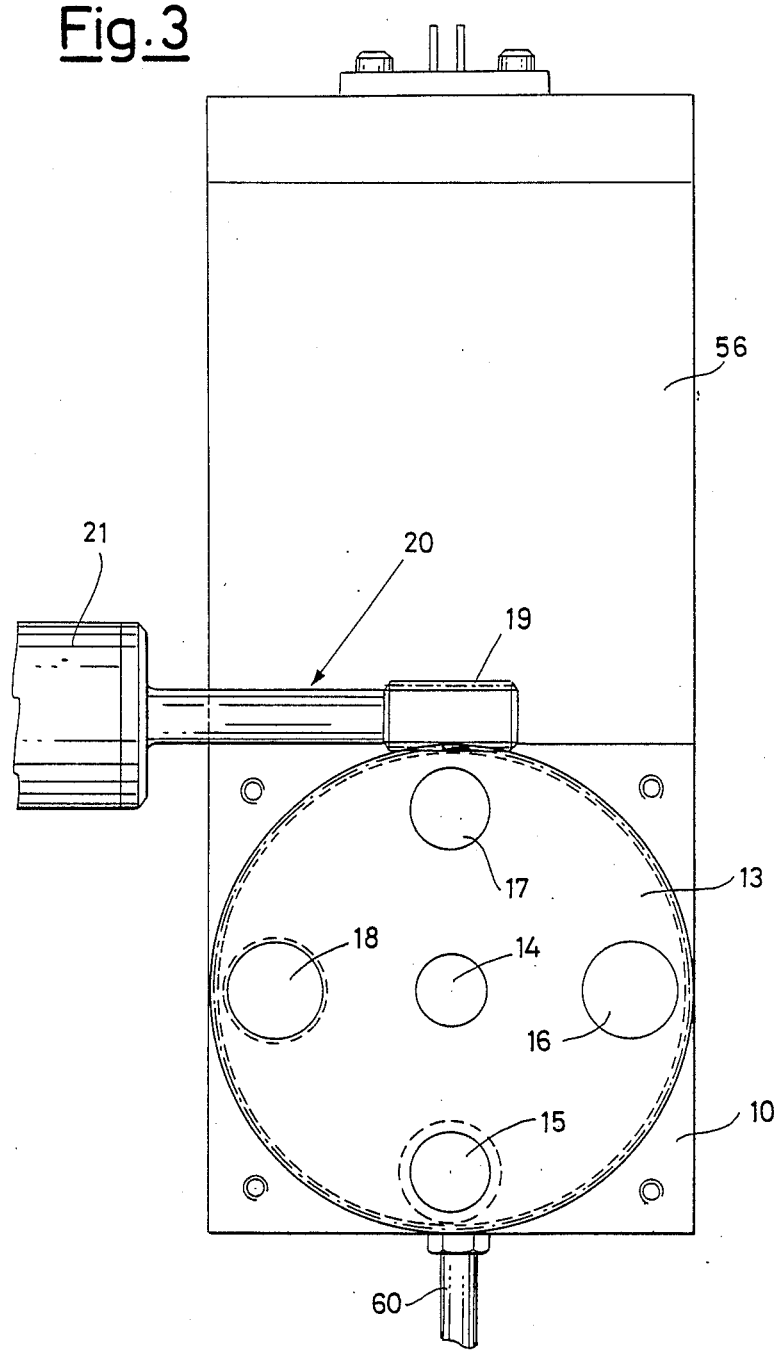
FIG. 3 is a plan view from above of the rotatable board of the apparatus of FIG. 1.
Figure 7:
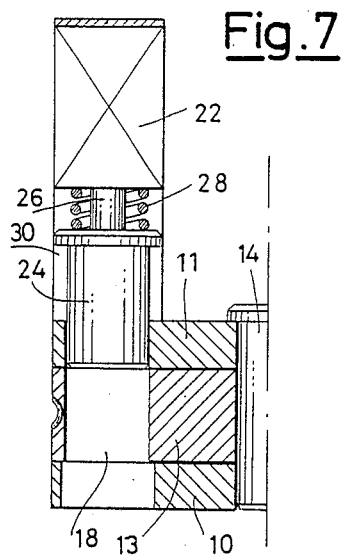
FIGS. 7 and 8 are partial, cross-section views of the ejecting mechanisms of the coffee grounds in the resting and ejecting positions respectively.
Figure 4:
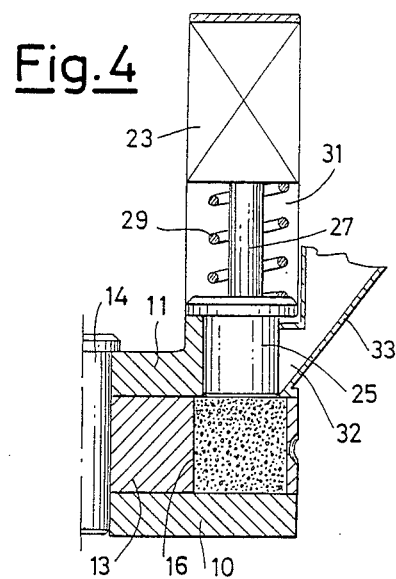
FIGS. 4 and 5 are partial, cross-section views of the fresh coffee grounds charging mechanism, according to two alternative embodiment.
Figure 8:
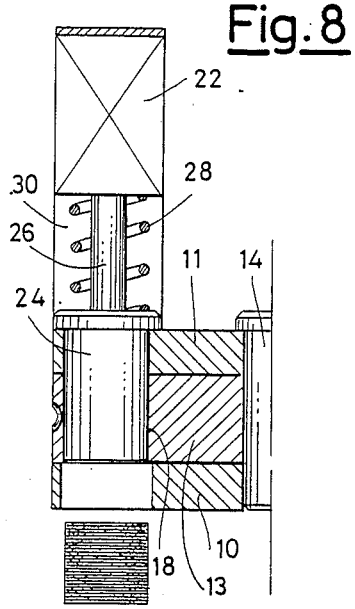

In the upper flange, in a position corresponding to that which in FIG. 3 is occupied by the cylindrical hole 15, a cylindrical seat in formed wherein a support for infusion shower 37 is housed and fastened by bolts 36, said support having an inner cylindrical cavity 38 in which a piston 39 is housed.

Figure 6:
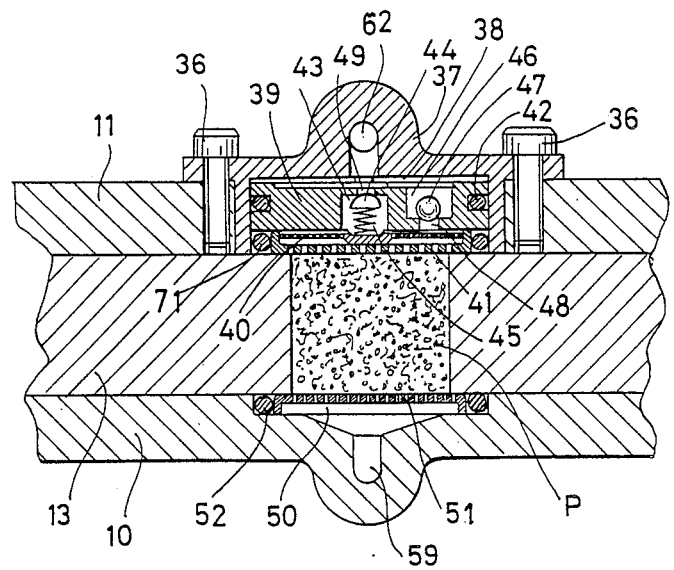
FIG. 6 is a detailed cross-section view, in an enlarged scale, of the control device of the filter pressure.
Figure 6:
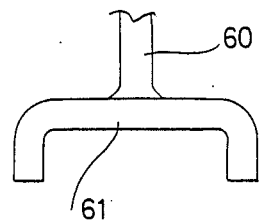

The cylindrical cavity 48 (see FIG. 6) is downwardly closed by the usual shower 40 combined with the filter 41, with a perimetral tight sealing provided by a gasket (O-ring) 71.

The piston 39 is sealed in a tight fit with respect to the cylindrial cavity 38 by means of a further perimetral gasket 42.

A seat 43 is formed in the body of the piston 39 wherein a needle valve 44 is housed, having a predetermined setting determined by means of the loading spring 45. A second seat 46 is formed in the body of the piston 39, in which a ball valve 47 is housed intercepting the venting cavity 48, whereas the needle valve 44 intercepts the connecting passage 49. In turn the lower plate 10 has a seat 50, vertically aligned with the support 37, in which the filter 51 is housed, the tight sealing of which is ensured by the perimetral gasket (O-ring) 52.

Above the cylindrical cavity 38 the support is provided with a channel 62 for the feeding of the infusion water, which is conveyed by means of the charging pipe 53, (see FIG. 9), which in turn communicates, through a three way electrovalve 54, with the heat exchanger 55 immersed within the boiler 56 heated by the electrical resistance 57.

The arrow 58 indicates the inlet of water pressure, for example from the tap water network or from a proper pump (not shown).

The seat 50 (see FIG. 6) is downwardly converging towards a delivery duct 59 connected by a delivery pipe 60 to a serving splitting spout 61.

Figure 5:
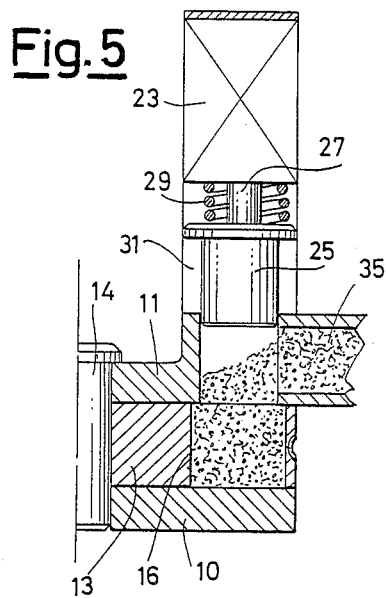

The operation of the automatic group according to the present invention shall be now described:

(1) Depending on the preselected amount of ground coffee in a per se known manner the rotatable board is rotated by the motor 21 until the corresponding cylindrical hole, namely 15 or 17 for a single serving or 16 or 18 for two serving, is brough into vertical alignment with the presser 25 which shall be in the fully raised position (shown for instance in FIG. 5).

It is by the way to be noticed that, as it is obvious, each time the board 13 must be rotated the piston 24 must be in a raised position, namely, with the electromagnet in the energized condition, since the pressing piston 35 (see FIG. 5) attains the end of its stroke flush with the board 13. For sake of simplicity it will be assumed that the cylindrical hole 15 is in that position in this operation.

(2) The actuation of the dosing device of the fresh coffee grounds causes the desired amount of coffee grounds to be introduced within the cylindrical hole 15, whereafter the presser 25, owing to the actuation of the electromagnet 23, carries out the pressing of the grounds in the cylindrical hole 15, closed at the lower end by the flange 10, forming therein a coffee pad P having the desired degree of packing.

(3) The rotation by one fourth of turn of the rotation board 13 brings the hole 15 with the pad P therein contained in axial vertical alignment with the shower support 37.

(4) At that point the electrovalve 54 (see FIG. 9) is opened and water pressure arrives, through the feeding pipe 53 and the duct or channel 62 (see FIG. 6), above the piston 39. The displacement, even if minimum, of the piston 39 under the hydraulic pressure has, as the first effect, that of acting on the gasket 71 thus achieving the sealing effect with respect to the rotating board 13. As a consequence the action on the rotating board a sealing effect between the lower surface on the board itself and the gasket 52 of the filter carrying cavity is caused to occur. At this point the opening of the needle valve 44 permits the water to come above the shower 40 and therefrom to enter the pad P of coffee whereby the infusion occurs; the resulting coffee is collected through the filter 51 and conveyed through the pipe 60 to the splitting spout 61.

(5) Once the infusion is completed the feeding of water under pressure through the electrovalve 54 is stopped; it being switched to connect the charging pipe 53 to the discharge and thus also chamber 38. Owing to the fact that in the filter formed by the coffee charge between the shower 40 and the filter 51 the infusion pressure still exists, it is discharged through the cavity 48 and the ball valve 47, thus achieving the simultaneous removal of the residual moisture in the coffee grounds is impregnated.

The latter thus becomes sufficiently dry.

(6) The last operating phase consists in the rotation of the board 13 to bring the cylindrical hole 15 into axial alignment with the ejecting piston 24, at which the lower plate or flange 10 has a proper opening.

Upon the electromagnet 22 being actuated, the piston 24 ejects the used coffee grounds charge and the apparatus is ready for the preparation of another serving of expresso coffee.

From the proceeding description the two main advantages of the automatic apparatus of the present invention clearly appear.

Firstly, upon the number of serving selected (one or two), the operating cycle from the charging of the fresh coffee grounds to its pressing, to the carrying out of the infusion and to the ejection of the coffee grounds takes place within only 180° of rotation of the rotatable board 13, with the self evident time saving.

Secondly the venting of the residual pressure present in the coffee charge causes a substantial drying of the coffee grounds to take place, whereby the drawback of the soiling of the other member of the apparatus during the coffee ground discharge is eliminated, as well as that of the permanence of residues of coffee grounds within the filter and/or the shower.

Another important advantage of the present invention is that, before the water under pressure causes the needle valve 44 to be opened, the pressure itself ensures the tight sealing between the rotating board 13 and the two cavities respectively containing the shower 40 and the filter 41 as well as the filter 51. This is an important problem for the rotating board groups.

A further advantage of the present invention resides in the simplicity and structure functionality by which the operating reliability is ensured, it being especially useful for the use in automatic distributing machines without a manoeuvering attendant.

The present invention has been described with reference to a preferred embodiment, it being meant that conceptually and mechanically equivalent variations and modifications are possible and foreseeable without falling out of the scope of the invention.

I claim

1. In an automatic apparatus for preparation of one of more servings of expresso coffee, such apparatus including a rotatable board provided with at least one cylindrical through hole with a size suited for holding a predetermined amount of fresh coffee grounds, said board being driven into rotation by motor means so that said at least one cylindrical through hole assumes, consecutively, three pre-set positions for the charging and pressing of the fresh coffee grounds, for the infusion with hot water under pressure into the coffee grounds and for the discharge of used coffee grounds, respectively, said board being rotatingly housed between two fixed plates, of which the top plate supports means for the charging of desired amounts of fresh coffee grounds in said at least one cylindrical through hole, means for the pressing of the ground coffee disposed is said at least one cylindrical through hole, and ejection means for discharging the coffee grounds, said charging and pressing means and said ejection means being mounted in diametrically opposed positions with respect to said rotatable board, the improvement wherein the said top plate is fitted with a support for an infusion shower of hot water under pressure at the infusion position, said support having a cylindrical cavity in which is slidingly disposed a piston, said cavity being connected, through flow interception valve means, to a supply of hot water under pressure, said shower being mounted under said piston and being connected with said cavity above said piston both through first non return valve means openable under a pre-set pressure and through second relief valve means, said lower plate being provided, at said infusion position, with a filter seating cavity in communication with a delivery spout for the prepared expresso coffee, said first non return valve means being set to open when the hot water feeding pressure is higher than a pre-set value, and said second relief valve means being pre-set to vent residual pressure under said shower and piston.

2. Automatic apparatus according to claim 1, wherein said first non return valve means consist of a needle valve provided with a loaded return spring.

3. Automatic apparatus according to claim 1, wherein the said second relief valve means consist of a ball valve.

4. Automatic apparatus according to claim 1, wherein the said first valve means and said second valve means are rigidly connected to said piston and movable therewith.

5. Automatic apparatus according to claim 1, wherein with said shower a water distributing filter is connected, said filter being periferically provided with a first gasket so that hydraulic pressure operating on said piston before the opening of said first valve means cause said first gasket to seal against the underlying rotatable board along the edges of said at least one cylindrical through hole, the rotatable board being consequently sealingly pressed against a second gasket fitted along the edge of said filter seating cavity.

6. Automatic apparatus according to claim 1, wherein said rotatable board is provided with a peripheral toothing meshing with threading of a worm screw being connected for rotation with an electric step-by-step motor.

7. Automatic apparatus according to claim 1, wherein sadi rotatable board has four cylindrical through holes staggered by 90°, said holes being equal two by two and being suitable to receive respective amounts of coffee grounds corresponding to one or two expresso coffee servings.

8. Automatic apparatus according to claim 1, wherein said means for charging expresso coffee grounds consist of a hopper fed by dosing means for fresh coffee grounds.

9. Automatic apparatus according to claim 1, wherein said charging means consist of a lateral port with respect to a frame supporting said pressing means, said lateral port being connected with a dosing piston mechanism for fresh coffee grounds.

10. Automatic apparatus according to claim 1, wherein said pressing means consist of a vertically movable piston operated through a stem by an electromagnet, and return spring mean opposed to the action of said electromagnet.

11. Automatic apparatus according to claim 1, wherein said ejecting means consist of a vertically movable piston operated through a stem by an electromagnet, and said fixed lower plate being correspondingly provided with a through discharging hole.

12. Automatic apparatus according to claim 1, wherein said flow interception valve means consist of a three-way solenoid valve, one of these ways being a free outlet and a second one being connected to said supply of hot water under pressure, whereby said cavity of said shower support, connected with the third way of the solenoid valve, can be alternately connected with said first and second ways.

* * * * *